US011251591B2

(12) United States Patent
Shirai et al.

(10) Patent No.: US 11,251,591 B2
(45) Date of Patent: Feb. 15, 2022

(54) INSULATION FILM PEELING METHOD

(71) Applicants: TOYOTA JIDOSHA KABUSHIKI KAISHA, Toyota (JP); DENSO CORPORATION, Kariya (JP)

(72) Inventors: Ken Shirai, Miyoshi (JP); Akihiro Ueda, Nissin (JP); Yasuyuki Hirao, Okazaki (JP); Toshiro Nakamura, Nissin (JP); Hiroaki Takeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 441 days.

(21) Appl. No.: 16/286,794

(22) Filed: Feb. 27, 2019

(65) Prior Publication Data
US 2019/0280574 A1 Sep. 12, 2019

(30) Foreign Application Priority Data
Mar. 7, 2018 (JP) .............................. JP2018-041006

(51) Int. Cl.
| B23K 26/06 | (2014.01) |
| H02K 15/00 | (2006.01) |
| H02G 1/12 | (2006.01) |
| B23K 26/082 | (2014.01) |
| B23K 26/362 | (2014.01) |
| B23K 26/402 | (2014.01) |
| B23K 26/0622 | (2014.01) |
| B23K 101/34 | (2006.01) |
| B23K 103/00 | (2006.01) |
| B23K 101/38 | (2006.01) |

(52) U.S. Cl.
CPC ......... *H02G 1/128* (2013.01); *B23K 26/0622* (2015.10); *B23K 26/082* (2015.10); *B23K 26/362* (2013.01); *B23K 26/402* (2013.01); *H02K 15/0068* (2013.01); *B23K 2101/34* (2018.08); *B23K 2101/38* (2018.08); *B23K 2103/42* (2018.08)

(58) Field of Classification Search
CPC .............................. B23K 26/082; H02G 1/128
See application file for complete search history.

(56) References Cited

FOREIGN PATENT DOCUMENTS

| CN | 107175409 A | 9/2017 |
| JP | 2007-067206 A | 3/2007 |
| JP | 2009-297732 A | 12/2009 |
| JP | 2017-123294 A | 7/2017 |

*Primary Examiner* — Dana Ross
*Assistant Examiner* — Lawrence H Samuels
(74) *Attorney, Agent, or Firm* — Sughrue Mion, PLLC

(57) ABSTRACT

An insulation film peeling method which radiates laser light onto a front end portion of an insulation film-coated conducting wire including a conducting wire and an insulation film in a longitudinal direction, and which peels a part of the insulation film up to a peeling boundary of a predetermined regulated peeling length, includes performing a rectilinear scan of a first region, in which a radiation position of the laser light moves from one side toward the other side and then moves from the other side toward the one side upon reaching the other side, and performing a unidirectional scan of a second region, in which the radiation of the laser light is performed from one side toward the other side and then the radiation position returns to the one side in a state in which the radiation of the laser light stops upon reaching the other side.

11 Claims, 10 Drawing Sheets

PULSE FREQUENCY f0

PULSE FREQUENCY f1(>f0)

INSULATION FILM PEELING METHOD

INCORPORATION BY REFERENCE

The disclosure of Japanese Patent Application No. 2018-041006 filed on Mar. 7, 2018 including the specification, drawings and abstract is incorporated herein by reference in its entirety.

BACKGROUND

1. Technical Field

The present disclosure relates to an insulation film peeling method, more particularly, to an insulation film peeling method of an insulation film-coated conducting wire by radiation of laser light.

2. Description of Related Art

For example, in order to connect winding wires of respective phases of a three-phase rotary electric machine by a predetermined winding method, an insulation film at an end portion of an insulation film-coated conducting wire, which is the winding wire, is peeled such that a conducting wire part is exposed to join a conducting wire part of a corresponding side by welding or the like. Since the insulation film has a role of protecting the conducting wire which is a metal core wire, a peeling length of the insulation film is regulated by an insulation specification of the rotary electric machine or the like. In the related art, the insulation film is physically peeled with a blade, and thus the peeling length can be controlled with a relatively high precision.

These days, with a widespread usage of laser processing, the radiation of the laser light has been used to peel the insulation film. For example, Japanese Unexamined Patent Application Publication No. 2017-123294 (JP 2017-123294 A) discloses a method of removing an insulation film of a terminal portion in a rectangular conducting wire having the insulation film by radiation of laser light. In this case, a unidirectional scan method is used, in which scan with the laser light is performed a plurality of times in one direction, from a side edge portion on one side of the terminal portion from which the insulation film is to be removed toward a side edge portion on the other side.

SUMMARY

In a case of peeling the insulation film of the insulation film-coated conducting wire by the radiation of the laser light, according to the scan method in one direction from one side to the other side, a laser head returns to the one side for each radiation. Since the laser radiation is not performed during a backward time to return, an operation time to peel the insulation film becomes long. Further, when the laser light is continuously radiated onto the insulation film for a long time, a part of the insulation film desired to remain for an insulation function may be excessively heated and carbonized, a peeling length may fluctuate, and an insulation performance may decrease. Therefore, there is a need for an insulation film peeling method that can shorten the operation time to peel the insulation film while securing the insulation performance.

A first aspect of the present disclosure relates to an insulation film peeling method. The insulation film peeling method is a method which radiates laser light onto a front end portion of an insulation film-coated conducting wire including a conducting wire and an insulation film that coats the conducting wire in a longitudinal direction, and which peels a part of the insulation film up to a peeling boundary of a predetermined regulated peeling length as measured from the front end portion, the insulation film peeling method including performing a rectilinear scan of a first region up to a regional boundary regulated in advance in front of the peeling boundary as measured from the front end portion, in which a radiation position of the laser light moves from one side toward the other side and then moves from the other side toward the one side upon reaching the other side, and performing a unidirectional scan of a second region from the regional boundary to the peeling boundary, in which the radiation of the laser light is performed from one side toward the other side and then the radiation position returns to the one side in a state in which the radiation of the laser light stops upon reaching the other side.

According to the first aspect, the regional boundary is regulated in front of the peeling boundary corresponding to the predetermined peeling length. Since the laser light is radiated by the rectilinear scan, at a turning position, the first region on the front end side receives backward radiation subsequent to forward radiation. Accordingly, with heat applied by the forward radiation being not radiated, subsequently heat is applied, and thus efficiency of peeling the insulation film can be high to shorten an operation time to peel the insulation film. On the other hand, the second region on a peeling boundary side receives solely the forward radiation of the laser light and does not receive the backward radiation of the laser light, and thus it is possible to secure an insulation performance without excessive heating of the insulation film, although the operation time to peel the insulation film becomes long.

A second aspect of the present disclosure relates to an insulation film peeling method. The insulation film peeling method is a method which radiates laser light onto a front end portion of an insulation film-coated conducting wire including a conducting wire and an insulation film that coats the conducting wire in a longitudinal direction, and which peels a part of the insulation film up to a peeling boundary of a predetermined regulated peeling length as measured from the front end portion, the insulation film peeling method including performing a rectilinear scan of a first region up to a regional boundary regulated in advance in front of the peeling boundary as measured from the front end portion, in which a radiation position of the laser light moves from an intermediate position toward the other side, moves toward one side from the other side upon reaching the other side to turn back, and the radiation position of the laser light moves from the one side toward the intermediate position upon reaching the one side to turn back and then returns to the intermediate position, and performing a unidirectional scan of a second region from the regional boundary to the peeling boundary, in which the radiation of the laser light is performed from one side toward the other side and then the radiation position returns to the one side in a state in which the radiation of the laser light stops upon reaching the other side.

According to the second aspect, in comparison with a case where any end surface side of the first region is set as a radiation start position in the first region, the turning position of the laser radiation scan with high efficiency of peeling the insulation film can be doubled and the operation time to peel the insulation film can be short.

In the first and second aspects of the present disclosure, in the scan of the first region, the one side may be the front end portion and the other side may be the regional boundary. In the scan of the second region, the one side may be the regional boundary and the other side may be the peeling boundary.

In the first and second aspects of the present disclosure, a movement of the laser light may be a micro movement for each radiation pitch.

In the first and second aspects of the present disclosure, a direction in which the insulation film-coated conducting wire extends may be set as the longitudinal direction, along a width of the insulation film-coated conducting wire, a right side may be set as a right side in a width direction and a left side may be set as a left side in the width direction, in the scan of the first region, the one side in the longitudinal direction may be set as the front end portion, and the other side in the longitudinal direction may be set as the regional boundary, in the movement of the laser light, the rectilinear scan in the width direction may be performed by a micro scan by the micro movement for each radiation pitch between the right side and the left side, and a forward scan in the longitudinal direction may be performed from the front end portion toward the regional boundary by repeating the rectilinear scan in the width direction from the front end portion toward the regional boundary, after the forward scan, a backward scan in the longitudinal direction may be performed from the regional boundary toward the front end portion by repeating the rectilinear scan in the width direction from the regional boundary toward the front end portion, and the scan may be repeated a predetermined number of times to be set as the rectilinear scan in the scan of the first region. In the scan of the second region, the one side in the longitudinal direction may be set as the regional boundary, the other side in the longitudinal direction may be set as the peeling boundary, in the movement of the laser light, a rectilinear unidirectional scan in the longitudinal direction may be performed from the regional boundary toward the peeling boundary by the micro scan by the micro movement for each radiation pitch, the rectilinear unidirectional scan in the longitudinal direction may be performed from the right side in the width direction toward the left side in the width direction, and the scan may be repeated a predetermined number of times to be set as the unidirectional scan in the scan of the second region.

In the first and second aspects of the present disclosure, in the scan of the first region, the first region may be divided into a plurality of sub regions, and intermediate positions of the sub regions may be set as radiation start positions for the respective sub regions.

According to the first and second aspects, in comparison with the radiation start from the intermediate position in the first region, the number of the turning positions of the laser radiation scan with the high efficiency of peeling the insulation film can be increased according to the number of the sub regions in the first region to further shorten the operation time to peel the insulation film.

In the first and second aspect of the present disclosure, in the scan of the second region, the movement of the laser light may be the micro movement for each radiation pitch along a scan direction which inclines at a predetermined angle with respect to the longitudinal direction of the insulation film-coated conducting wire.

According to the first and second aspects, since the scan direction in the scan of the second region inclines, in comparison with a case of not inclining, the scan time can become longer and the insulation film can be slowly peeled to easily secure the insulation performance.

According to each aspect of the present disclosure, it is possible to shorten the operation time to peel the insulation film while securing the insulation performance.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
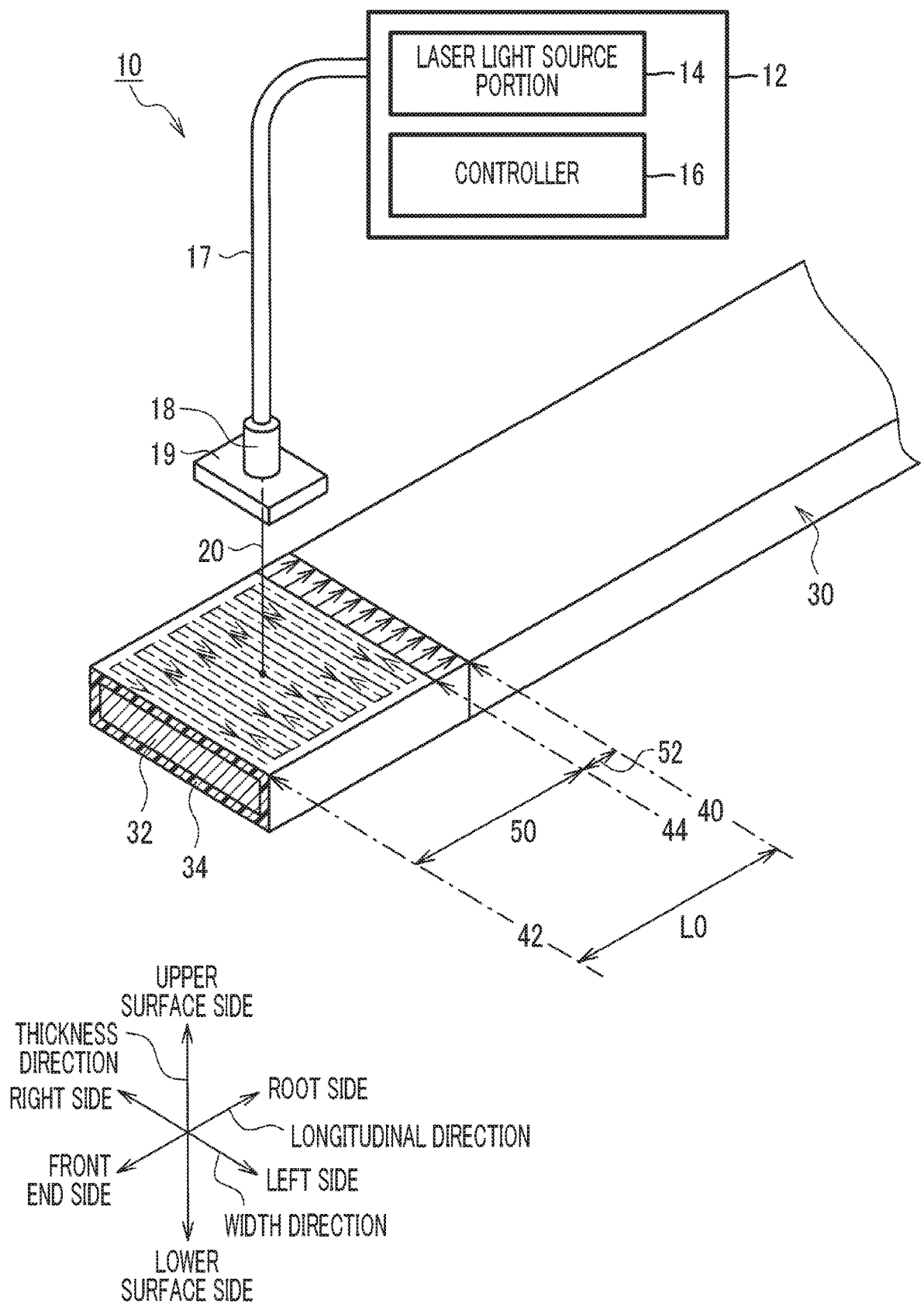
FIG. 1 is a configuration diagram of an insulation film peeling system using laser light in which an insulation film peeling method according to an embodiment is executed.

Embodiments according to the disclosure will be described in detail below with reference to the drawings. In the following description, as an insulation film-coated conducting wire, a segment coil used for stator winding wires of a rotary electric machine mounted on a vehicle will be described; the description, however, is an example for description, any insulation film-coated conducting wire in need of peeling of an insulation film on a front end portion side may be used.

Shapes, materials, dimensions, and the like described below are examples for description, and can be appropriately changed depending on a specification of an insulation film peeling method and the like. Further, hereinafter, the same reference numerals are given to similar elements in all drawings, and redundant descriptions are omitted.

FIG. 1 is a configuration diagram of an insulation film peeling system 10 using laser light. Hereinafter, unless otherwise specified, the insulation film peeling system 10 using the laser light is referred to as an insulation film peeling system 10. The insulation film peeling system 10 includes a control device 12. The control device 12 has a laser light source portion 14 and a controller 16 that executes an insulation film peeling program used for the insulation film peeling method. The insulation film peeling program is stored in the memory of the controller 16. The laser light source portion 14 includes a YAG laser of a wavelength of 1.06 µm and an optical system that shapes the laser light radiated by the YAG laser into a beam shape. A laser fiber 17 is an optical component that guides laser light 20 supplied from the laser light source portion 14 to a laser head 18. The laser head 18 includes a scan portion 19 and scans any position of a radiation target with the laser light 20 under a control of the controller 16.

The laser light source portion 14 shapes the laser light radiated by the YAG laser and having a predetermined laser power W0 into a laser beam having a predetermined beam diameter d0 and outputs the laser beam power. The laser light 20 radiated from the laser head 18 is pulsed laser light which is radiated by pulsing the laser beam having the beam diameter d0 from the laser light source portion 14 at a predetermined pulse frequency f0 under the control of the controller 16.

The scan portion 19 is provided in the laser head 18 and is a mechanism that moves the laser beam having the beam diameter d0 radiated from a front end of the laser head 18 in any direction. As the mechanism of the scan portion 19, an XY stage is used. In this case, a front surface of the radiation target is disposed to be parallel to an XY plane of the XY stage, the laser beam is radiated vertically downward with respect to the XY plane, and thus the radiation of a spot 22 having the same diameter as the beam diameter d0 is performed on the front surface of the radiation target. Here, the XY stage is moved at a predetermined scan speed V0 (cm/s) along a predetermined scan path 24 (see FIG. 2), and thus the scan of the spot 22 is performed at a radiation pitch P0=(V0/f0) along the scan path 24.

Hereinafter, the laser light 20 has the laser power W0 at the wavelength of 1.06 µm, and the surface of the radiation target is irradiated with the pulsed laser light at the pulse frequency f0 as the spot 22 having the same diameter as the beam diameter d0, and is scanned at the radiation pitch P0 along the scan path 24.

FIG. 1 shows an insulation film-coated conducting wire 30 which is the radiation target of the laser light 20, although which is not a constituent element of the insulation film peeling system 10. The insulation film-coated conducting wire 30 is the segment coil used for the stator winding wires of the rotary electric machine mounted on the vehicle. The insulation film-coated conducting wire 30 is a rectangular wire having a conducting wire 32 having a rectangular cross section (meaning of "rectangular" in the specification includes "substantially rectangular") and an insulation film 34 that coats the surface of the conducting wire 32. The conducting wire 32 is a metal core wire and a copper wire is used for the conducting wire. Instead of the copper wire, a copper tin alloy wire, a silver plated copper tin alloy wire or the like may be used. As the insulation film 34, a polyamide-imide enamel film is used.

The segment coil is disposed in a predetermined disposition relationship in the stator core of the rotary electric machine, a front end portion side of a segment coil is connected to a front end portion side of the other segment coil by welding or the like, and winding wires of respective phases are formed by a predetermined winding method.

Accordingly, it is needed to peel the insulation film on the front end portion side at a predetermined peeling length L0 to expose the conducting wire 32; therefore the insulation film peeling system 10 is used.

For the insulation film-coated conducting wire 30, FIG. 1 shows a peeling boundary 40 in which the insulation film 34 is irradiated by the laser light 20 to be peeled. A length as measured from a front end portion 42 of the insulation film-coated conducting wire 30 to the peeling boundary 40 is the peeling length L0. A region corresponding to the peeling length L0 is divided into two regions in which laser scan patterns are different from each other. When a boundary between the two regions is referred to as a regional boundary 44, the regional boundary 44 is set before the peeling boundary 40 as measured from the front end portion 42. A region from the front end portion 42 to the regional boundary 44 is referred to as a first region 50 and a region from the regional boundary 44 to the peeling boundary 40 is referred to as a second region 52. A relationship between a length of the first region in the longitudinal direction and a length of the second region in the longitudinal direction is (the length of the first region in the longitudinal direction)>(the length of the second region in the longitudinal direction). Details of the first region 50 and the second region 52 including reasons for the division into the first region 50 and the second region 52 will be described below.

In FIG. 1, as three directions orthogonal to each other, a longitudinal direction, a width direction, and a thickness direction are shown. The longitudinal direction is a direction in which the insulation film-coated conducting wire 30 extends, and in a case of distinguishing both directions in the longitudinal direction from each other, a direction toward the front end portion 42 of the insulation film-coated conducting wire 30 is set to be in a front end side and the opposite direction is set to be in a root side. The width direction is a width direction of the insulation film-coated conducting wire 30, and in a case of viewing the front end side from the root side to distinguish both sides in the width direction from each other, a right direction is set to be in a right side and a left direction is set to be in a left side. The thickness direction is a thickness direction of the insulation film-coated conducting wire 30, and in a case of distinguishing both sides in the thickness direction from each other, a direction of a radiation surface where the laser light 20 is radiated is set to be in an upper surface side, and the opposite side is set to be in a lower surface side. The same also applies to following figures.

Figure 2:
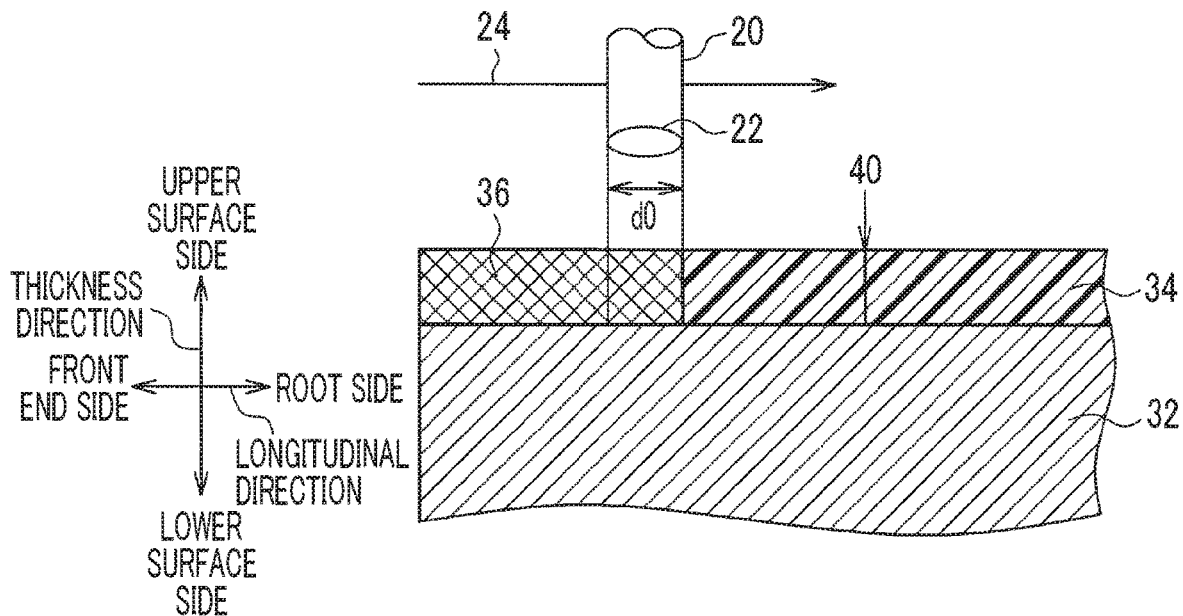
FIG. 2 is a diagram showing carbonization of an insulation film by radiation of the laser light.
Figure 3:
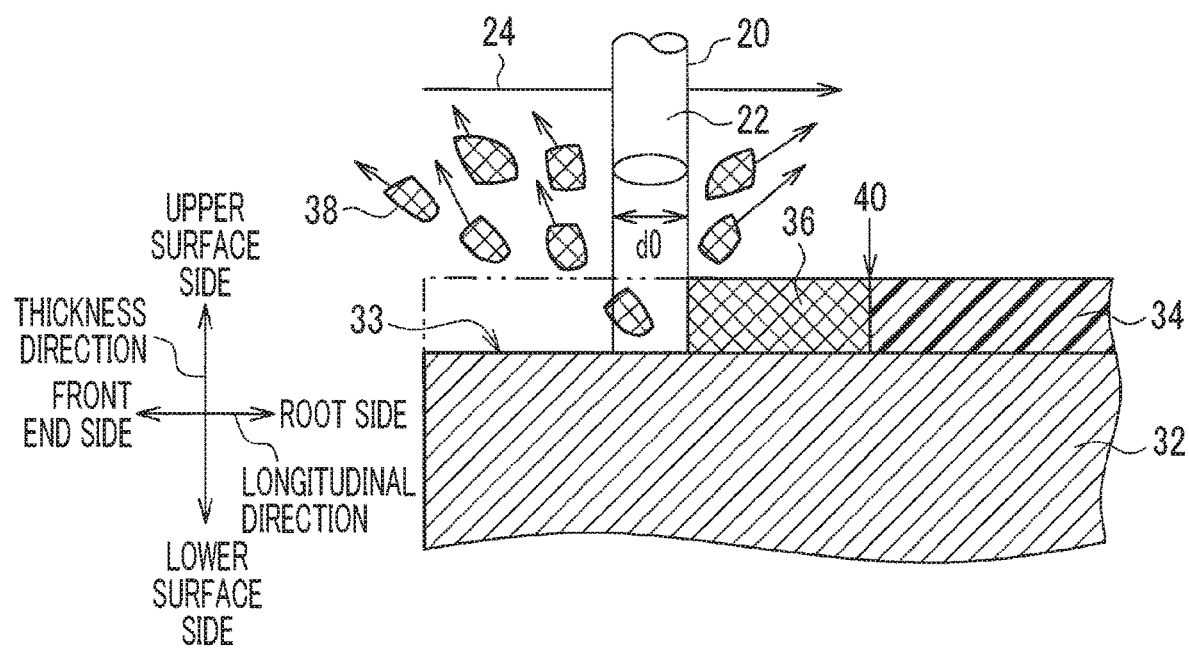
FIG. 3 is a diagram showing transpiration of a carbonized insulation film by the radiation of the laser light, subsequent to FIG. 2.

FIGS. 2 and 3 are diagrams showing the peeling of the insulation film 34 by the scan of the laser light 20 having the wavelength of 1.06 μm. In each figure, the spot 22 of the laser light 20 and the scan path 24 thereof are shown.

FIG. 2 is a diagram showing carbonization of the insulation film 34 by the radiation of the laser light 20 as a first step. The wavelength of 1.06 μm is an infrared wavelength, and thus passes through a polyamide-imide which is a material of the insulation film 34 and heats the copper of the conducting wire 32. The energy per unit area per unit time which the radiation target receives by the radiation of the laser light 20 is set as laser energy density, and when the laser energy density is equal to or higher than a predetermined value, the polyamide-imide is carbonized by the copper which becomes hot, and the insulation film 34 becomes a carbonized layer 36. FIG. 2 shows that the scan with the laser light 20 is on the way from the front end side toward the root side of the scan path 24, and thus in FIG. 2, the insulation film 34 on the front end side further than the current position of the spot 22 of the laser light 20 is the carbonized layer 36.

FIG. 3 shows that, as a second step after the first step, when the carbonized layer 36 is irradiated with the laser light 20, the black carbonized layer 36 absorbs the energy of the laser light 20 and becomes hot, and when the laser energy density is equal to or higher than the predetermined value, the carbonized layer 36 becomes debris 38, vaporizes, and transpires. FIG. 3 shows that the scan with the laser light 20 is on the way from the front end side toward the root side along the scan path 24, and thus in FIG. 3, the carbonized layer 36 on the front end side further than the current position of the spot 22 of the laser light 20 transpires, and a conducting wire-exposed surface 33 of the conducting wire 32 appears. In this manner, the insulation film 34 is peeled by the radiation of the laser light 20 having the laser energy density equal to or higher than the predetermined value.

Figure 4:
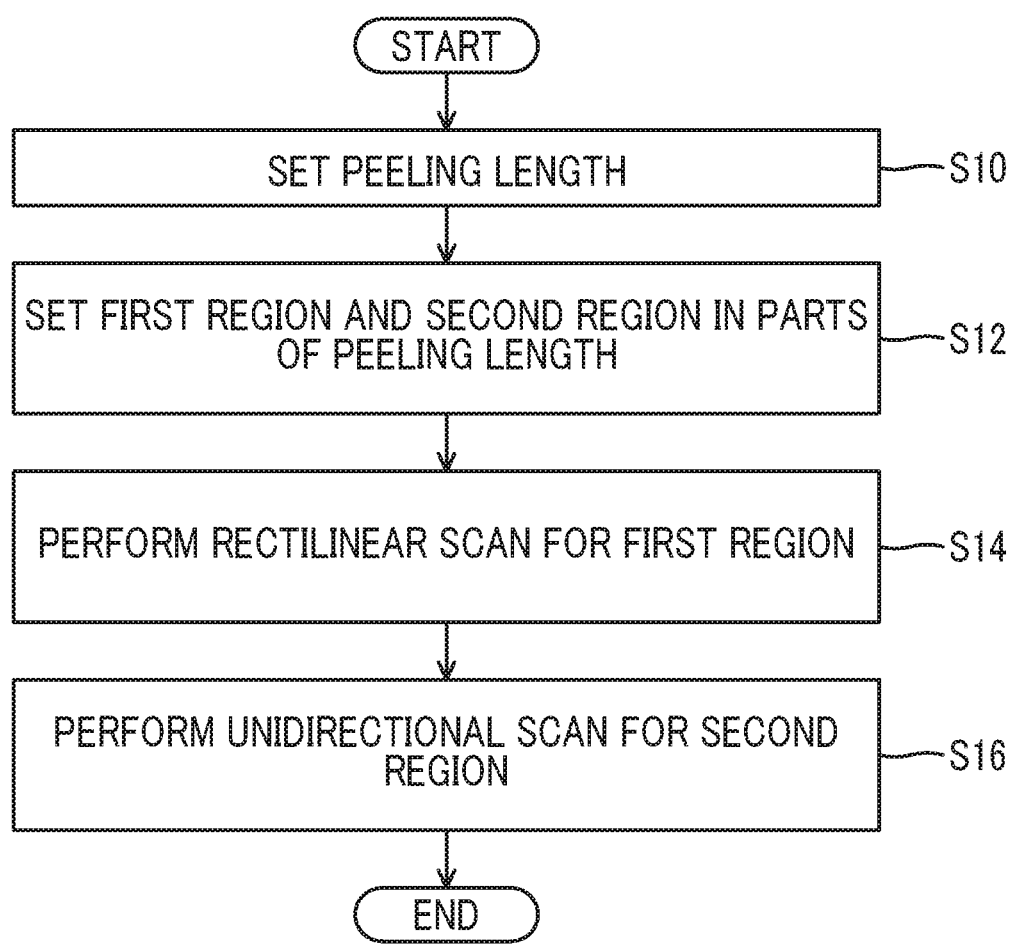
FIG. 4 is a flowchart showing a procedure of the insulation film peeling method according to the embodiment.

FIG. 4 is a flowchart showing a procedure of the insulation film peeling method. Each procedure corresponds to each processing procedure of the insulation film peeling program executed by the controller 16 of the insulation film peeling system 10.

First, the peeling length L0 is set (S10). The peeling length L0 can be regulated by a specification or the like of a connecting device that connects the conducting wire-exposed surfaces 33 at the front ends of a plurality of insulation film-coated conducting wires 30. An example of the connecting device is a welding device. For example, the peeling length L0 is several mm. Above description is an example for description, and the length may exceed 10 mm depending on cases.

Next, the first region 50 and the second region 52 are set in parts of the peeling length L0 (S12). Specifically, along the longitudinal direction, the peeling length L0 is divided into two, $L_{50}$ on the front end side and $L_{52}$ on the root side. Here, $L0=(L_{50}+L_{52})$, and $L_{50}>L_{52}$. In the example of FIG. 1, $L_{50}$ is five times $L_{52}$ (in the specification, meaning of "five times" includes "substantially five times"). Above description is an example for description, and can be appropriately changed depending on the specification of the connecting device, the specification of the insulation film-coated conducting wire 30, or the like.

Further, a rectilinear scan is performed for the first region 50 (S14). The rectilinear scan is a scan method in which a scan is performed such that the laser head 18 is moved from one side toward the other side within a scan region for a radiation position of the laser light 20 to move, and then, upon reaching the other side, the laser head 18 turns back to be moved from the other side toward the one side for the radiation position of the laser light 20 to be moved, while continuing the radiation of the laser light. The number of turn back is regulated by the specification or the like of the predetermined laser energy density requested for the insulation film peeling with respect to the insulation film-coated conducting wire 30. A scan mode in which the rectilinear scan is performed for the whole first region 50 is hereinafter referred to as a first scan mode of the laser light 20.

Further, a unidirectional scan is performed for the second region 52 (S16). The unidirectional scan is a scan method in which a scan is performed such that the laser head 18 is moved from one side toward the other side within the scan region for the laser light 20 is radiated, and then upon reaching the other side, the laser head 18 is returned to be moved to the one side in a state in which the radiation of the laser light 20 stops. The number of repetitions of the unidirectional scan is regulated by the specification of the predetermined laser energy density requested for the insulation film peeling with respect to the insulation film-coated conducting wire 30, and by the specification of insulation performance of the insulation film-coated conducting wire 30 or the like. A scan mode in which the unidirectional scan is performed for the whole second region 52 is hereinafter referred to as a second scan mode of the laser light 20.

In processing sequences of S14 and S16, S14 is performed first, then subsequently S16 is performed. Instead of the sequence, S16 may be performed first, then subsequently S14 may be performed.

Figure 5:
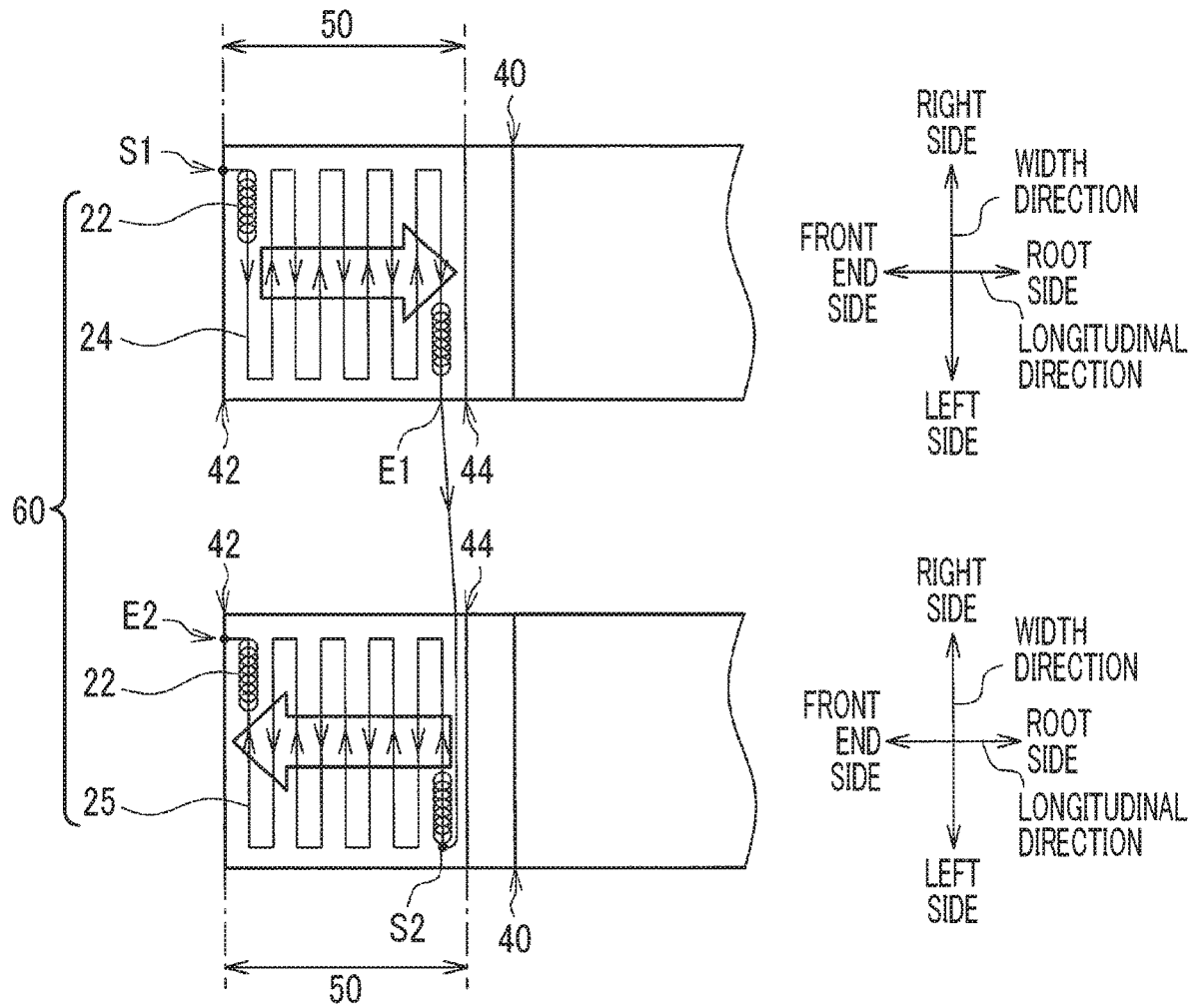
FIG. 5 is a diagram showing a rectilinear scan of a first region in the insulation film peeling method according to the embodiment. An upper diagram of FIG. 5 shows a forward scan, and a lower diagram shows a backward scan, subsequent to the forward scan of the upper diagram.
Figure 6:
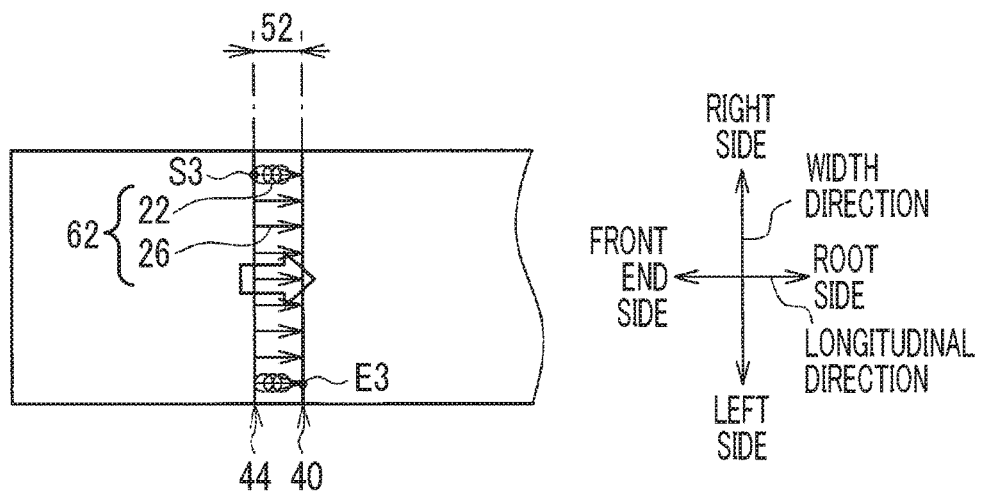
FIG. 6 is a diagram showing a unidirectional scan of a second region in the insulation film peeling method according to the embodiment.

The peeling length L0 is divided into the first region 50 and the second region 52 in order to secure the insulation performance of the insulation film 34 at the root side further than the peeling boundary 40, which does not receive the radiation of the laser light 20, and to shorten an operation time of peeling the insulation film on the front end portion 42 side of the insulation film-coated conducting wire 30. Here, the first scan mode and the second scan mode will be described with reference to FIGS. 5 and 6. FIG. 5 is a diagram showing a first scan mode 60 of the laser light 20 in the first region 50, and FIG. 6 is a diagram showing a second scan mode 62 of the laser light 20 in the second region 52.

FIG. 5 is a diagram showing the scan path 24 of a one time rectilinear scan for the first scan mode 60 in which the rectilinear scan is executed. An upper diagram of FIG. 5 shows the scan path 24 on a forward path of the one time rectilinear scan, and a lower diagram shows a scan path 25 on a backward path.

The scan path 24 on the forward path of the rectilinear scan in FIG. 5 is as follows. A position of a most front end side and a rightmost side in the first region 50 is a scan start position S1 on the forward path. Since the laser light 20 is the pulsed laser light, the scan of the spot 22 of the laser beam is performed on the scan path 24 at the radiation pitch P0. When the right side is set as the one side in the width direction, the scan of the spot 22 is performed along the scan path 24 in the width direction, from the scan start position S1 toward the left side which is the other side in the width direction. When the spot 22 reaches the left side which is the other side in the width direction, a micro scan of the spot 22 is performed along the longitudinal direction by merely the radiation pitch P0 on the root side which is the other side in the longitudinal direction (see FIG. 13A). This time, at the position where the micro scan in the longitudinal direction is performed, the scan of the spot 22 is performed along the scan path 24 in the width direction toward the right side which is the one side along the width direction. When the spot 22 reaches the right side which is the one side in the width direction, the micro scan of the spot 22 is performed along the longitudinal direction by merely the radiation pitch P0 on the root side which is the other side in the longitudinal direction, and subsequently the scan is performed along the scan path 24 toward the left side which is the other side in the width direction. An appropriate radius of curvature may be applied before and after the micro scan. For example, the scan direction may be changed from the other side in the width direction to the one side in the width direction while gently changing the radiation pitch. The same applies to the "micro scan" described below.

When the spot 22 reaches a position of a furthest root side and a leftmost side in the first region 50 by repeating the above described movement, the position is a scan end position E1 on the forward path. An outline arrow in the upper diagram of FIG. 5 schematically shows the forward path part of the first scan mode 60 in which the rectilinear scan in the width direction is repeated and the scan in the longitudinal direction from the front end side toward the root side is performed.

The scan path 25 on the backward path of the rectilinear scan is a scan path in which the scan end position E1 on the forward path is set as a scan start position S2 on the backward path and the scan direction in the scan path 24 on the forward path is set as a reverse orientation. In the lower diagram in FIG. 5, the position of the most front end side and the rightmost side in the first region 50 is a scan end position E2 on the backward path. The scan end position E2 on the backward path is the same as the scan start position S1 on the forward path. The outline arrow in the lower diagram of FIG. 5 schematically shows the backward path part of the first scan mode 60 in which the rectilinear scan in the width direction is repeated and the scan in the longitudinal direction from the root side toward the front end side is performed.

FIG. 6 is a diagram showing a scan path 26 of a one time unidirectional scan for the second scan mode 62 in which the unidirectional scan is executed. The scan path 26 of the one time unidirectional scan in FIG. 6 is as follows. A position of the regional boundary 44 on a most front end side and a rightmost side in the second region 52 is a scan start position S3 of the scan path 26 of the unidirectional scan. When the regional boundary 44 on the front end side is set as the one side in the longitudinal direction, the scan of the spot 22 is performed along the scan path 26 in the longitudinal direction, from the scan start position S3 toward the peeling boundary 40 which is the other side in the longitudinal direction. When the spot 22 reaches the peeling boundary 40 which is the other side in the longitudinal direction, the radiation of the laser light 20 stops, the laser head 18 returns to the regional boundary 44 which is the one side in the longitudinal direction, and further makes a micro movement by merely the radiation pitch P0 to the left side which is the other side in the width direction. At that position, the radiation of the laser light 20 starts, and along the scan path 26 toward the peeling boundary 40 which is the other side in the longitudinal direction, the scan of the spot 22 is performed. When the spot 22 reaches the peeling boundary 40 which is the other side in the longitudinal direction, the radiation of the laser light 20 stops, the laser head 18 returns to the regional boundary 44 which is the one side in the longitudinal direction, and further makes the micro movement by merely the radiation pitch P0 to the left side which is the other side in the width direction. When the spot 22 reaches a position of the peeling boundary 40 on a furthest root side and a leftmost side in the second region 52 by repeating the above described movement, the position is a scan end position E3 of the unidirectional scan. The outline arrow in FIG. 6 schematically shows the one time scan of the second scan mode 62 in which the unidirectional scan in the longitudinal direction is repeated and the scan in the width direction is performed from the right side toward the left side.

Figure 7A:
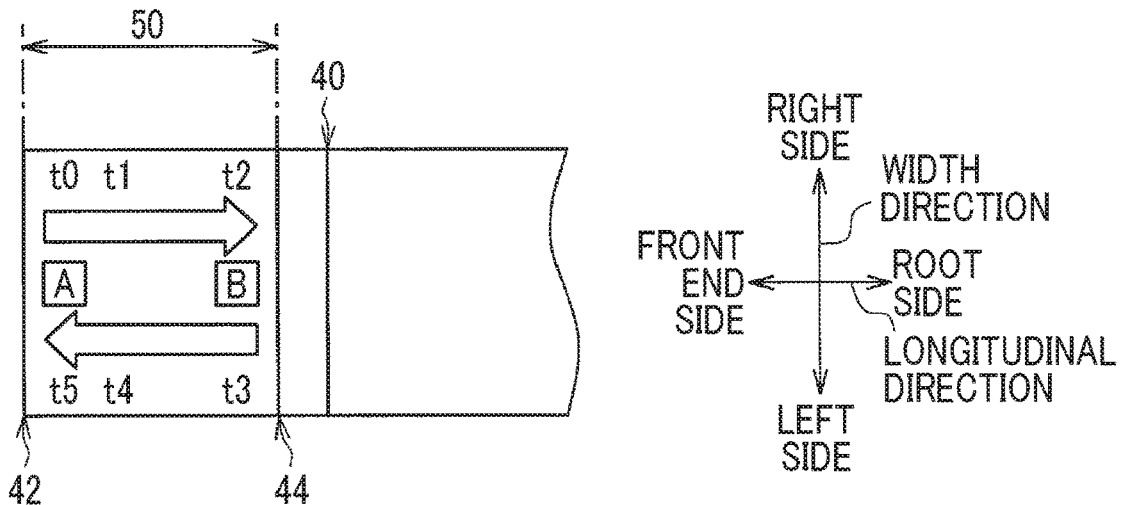
FIG. 7A is a diagram showing an operation effect of the rectilinear scan in the insulation film peeling method according to the embodiment by extracting a scan direction of an outline arrow in FIG. 5.
Figure 7B:
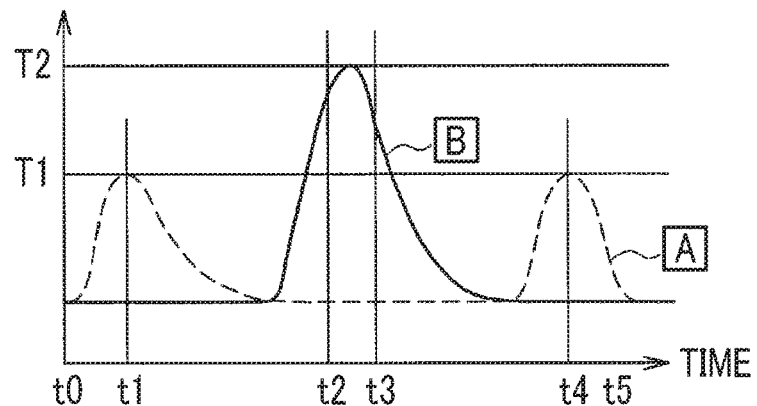
FIG. 7B is a diagram showing a temporal change in temperature at a temperature evaluation position in corresponding FIG. 7A, where a time is taken on a horizontal axis and a temperature is taken on a vertical axis.
Figure 8A:
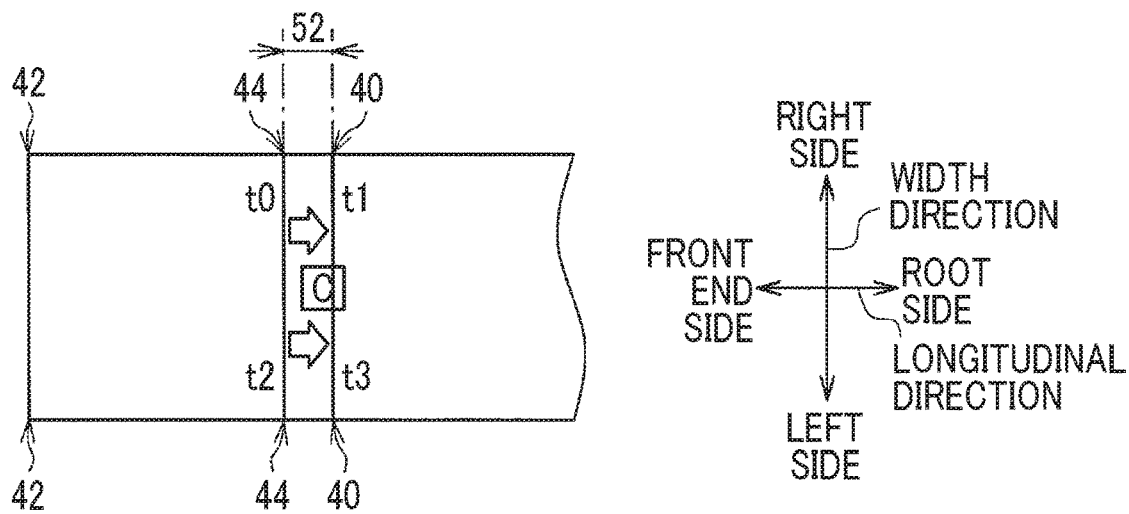
FIG. 8A is a diagram showing the operation effect of the unidirectional scan in the insulation film peeling method according to the embodiment by extracting the scan direction of the outline arrow in FIG. 6.
Figure 8B:
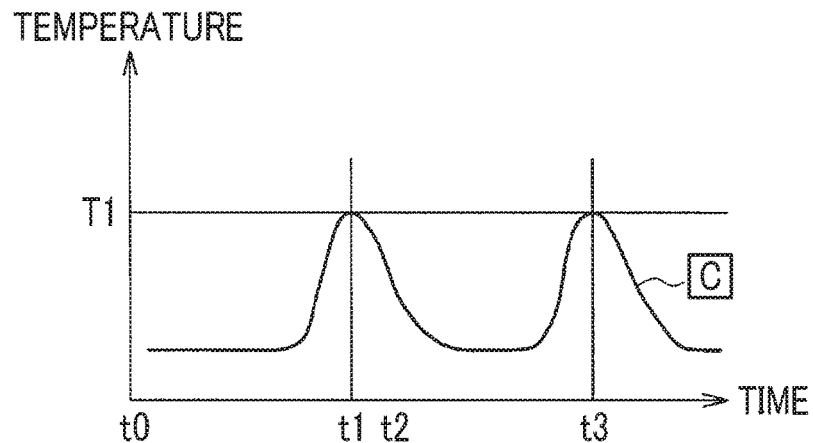
FIG. 8B is a diagram showing the temporal change in temperature at the temperature evaluation position in corresponding FIG. 8A, where the time is taken on the horizontal axis and the temperature is taken on the vertical axis.

Operation effects of the rectilinear scan and the unidirectional scan will be described with reference to FIGS. 7A, 7B, 8A, and 8B. In FIGS. 7A and 8A, the scan directions of the outline arrows in FIGS. 5 and 6 are extracted and shown, respectively and t0, t1, and the like are scan times. A scan start time is t0, and the number after t increases over time. A, B, and C surrounded by rectangular frames are temperature evaluation positions within the region. FIGS. 7B and 8B are diagrams showing temporal changes in temperature at the temperature evaluation positions in corresponding FIGS.

7A and 8A, where a time is taken on a horizontal axis and a temperature is taken on a vertical axis.

FIG. 7B is a diagram in which a point A is picked on the front end side and a point B is picked near the regional boundary 44 on the root side as the temperature evaluation positions in the first region 50 and which shows the temporal changes of the point A and the point B in temperature with respect to the rectilinear scan, respectively. The point A and the point B receive the radiation two times per reciprocation of the laser head 18; the point B, however, is a turning point of the laser head 18 in the rectilinear scan, receives the radiation of the spot 22 of the laser head 18 on the forward path at time t2, and subsequently receives the radiation of the spot 22 on the backward path at time t3. {(Time t3)−(time t2)} is a moving time of the spot 22 of the radiation pitch P0, which is calculated by (radiation pitch P0/scan speed V0), and is a short time. That is, the point B which is the turning position receives the radiation two times within the short time, and thus receives heat from the radiation of the spot 22 on the backward path before heat due to the radiation of the spot 22 on the forward path is released. Accordingly, temperature T2 of the point B which is the turning position becomes higher than temperature of the other position, and peeling efficiency of the insulation film 34 in the insulation film-coated conducting wire 30 improves in comparison with the other position. As described with reference to FIG. 5, in the one time rectilinear scan in the first region 50, the turning position continues to occur on a whole right side edge, a whole left side edge, and the whole regional boundary 44 in the first region 50. At the turning positions, the peeling efficiency of the insulation film 34 improves and thus the time it takes to peel the insulation film in the first region 50 is reduced in comparison with the case where unidirectional scan is performed.

On the other hand, the point A away from the turning point receives the radiation of the spot 22 on the forward path at time t1, receives the radiation of the spot 22 on the backward path at time t4, and thus a radiation interval becomes long and temperature T1 at the point A becomes lower than temperature T2 at the point B. In a case where the radiation interval is sufficiently long, temperature T1 at the point A becomes the same as the temperature in a case where the unidirectional scan is performed.

FIG. 8B shows the temporal change in temperature in a case where a point C is picked near the peeling boundary 40 as the temperature evaluation position in the second region 52 for the unidirectional scan, and the unidirectional scan is performed along the two scan paths 26, respectively. In the unidirectional scan, the laser head 18 radiates the laser light 20 during the movement from the regional boundary 44 to the peeling boundary 40; during the return from the peeling boundary 40 to the regional boundary 44, however, the radiation of the laser light 20 stops. In the example of FIG. 8B, the point C receives the radiation of the laser light 20 at time t1 and the temperature rises to T1; the temperature, however starts to drop at t2, and subsequently the temperature rises to T1 again at time t3 at which the radiation of the laser light 20 is received. In the second region 52, any position receives the radiation of the spot 22 at a fixed time interval, and does not receive the radiation of the laser light 20 at a shorter time interval in comparison with the others unlike the point B in the rectilinear scan of FIG. 7B. In the second region 52, at any position, the temperature rises to the T1 at the time of receiving the radiation of the laser light 20; the temperature, however, does not become a temperature higher than T1.

As can be understood by a comparison of FIG. 7B to 8B, in the rectilinear scan, the turning position has high temperature T2; in the unidirectional scan, however, the temperature at any position is temperature T1 lower than T2. In the rectilinear scan, the radiation of the spot 22 is received over the whole of the one reciprocation of the laser head 18; in the unidirectional scan, however, the radiation of the spot 22 is received solely on the forward path which is half the one reciprocation of the laser head 18. Accordingly, in the first region 50 where the rectilinear scan is performed, the peeling efficiency of the insulation film 34 improves and the radiation of the spot 22 is received over the whole reciprocation time such that the operation time to peel the insulation film becomes short. In the second region 52 where the unidirectional scan is performed, the scan time to peel the insulation film becomes long; the insulation film 34 on the root side further than the peeling boundary 40, however, is not exposed to excessively high temperature, and the insulation performance is secured.

Since the point A in FIGS. 7A and 7B is a position away from the turning position in the rectilinear scan, the time interval for receiving the radiation of the spot 22 is long, and the temperature is the same as T1 at the point C in the unidirectional scan. From this point, when the time interval for receiving the radiation of the laser light 20 is caused to be short, the temperature at that position can be high.

Figure 9A:
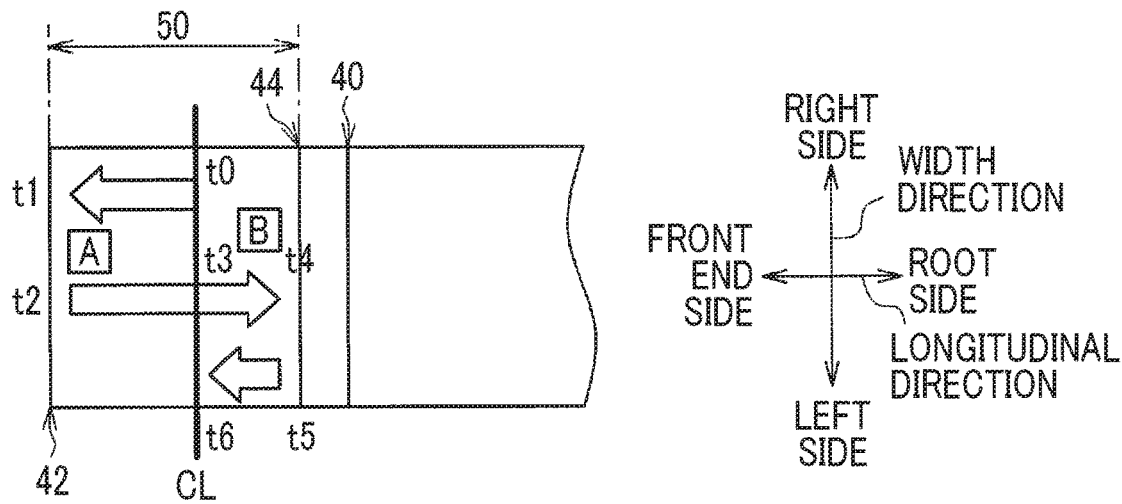
FIG. 9A is a diagram which corresponds to FIG. 7A and shows the rectilinear scan, in which an intermediate position of the first region is set as a radiation start position in the insulation film peeling method according to the embodiment.
Figure 9B:
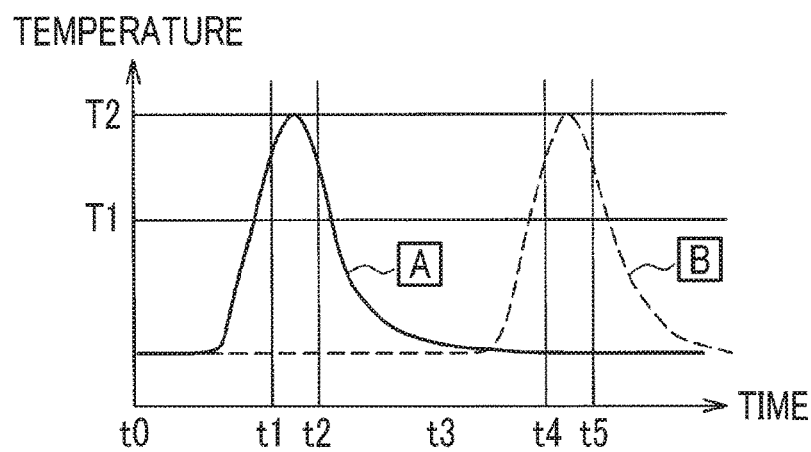
FIG. 9B is a diagram which corresponds to FIG. 7B and shows the operation effect of the rectilinear scan, in which the intermediate position of the first region is set as the radiation start position in the insulation film peeling method according to the embodiment.

FIGS. 9A and 9B are diagrams in which the radiation start position of the rectilinear scan is set to an intermediate position CL between the front end portion 42 and the regional boundary 44 in the first region 50, and which show the temporal changes in temperature at the point A on the front end side and the point B on the root side as in FIGS. 7A and 7B. FIG. 9A is a diagram corresponding to FIG. 7A, and FIG. 9B is a diagram corresponding to FIG. 7B.

As shown in FIG. 9A, the scan starts at time t0 at the intermediate position CL, proceeds toward the front end side, reaches the front end portion 42 at time t1 to turn back there, proceeds toward the root side from time t2, passes through the intermediate position CL at time t3, and reaches the root side at time t4. At that position, the scan turns back, proceeds toward the intermediate position CL from time t5, and returns to the intermediate position CL at time t6. In this case, both point A and point B are the turning positions such that the temperatures become high temperature T2 as shown in FIG. 9B.

Figure 10A:
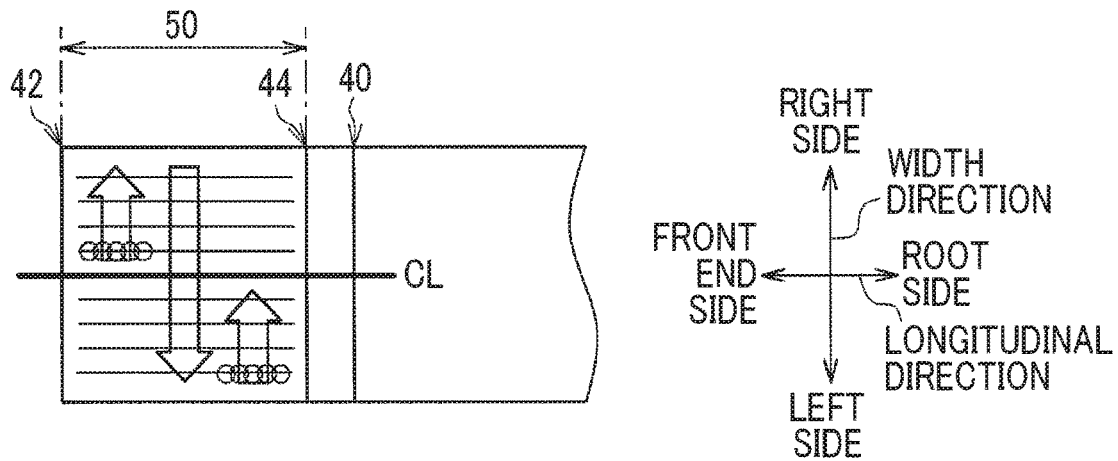
FIG. 10A is a diagram showing a case where, while the rectilinear scan in a longitudinal direction is repeated, a scan in a width direction is performed, and thus the rectilinear scan in the width direction is performed, as a first other example of the radiation start position of the rectilinear scan, in the insulation film peeling method according to the embodiment.
Figure 10B:
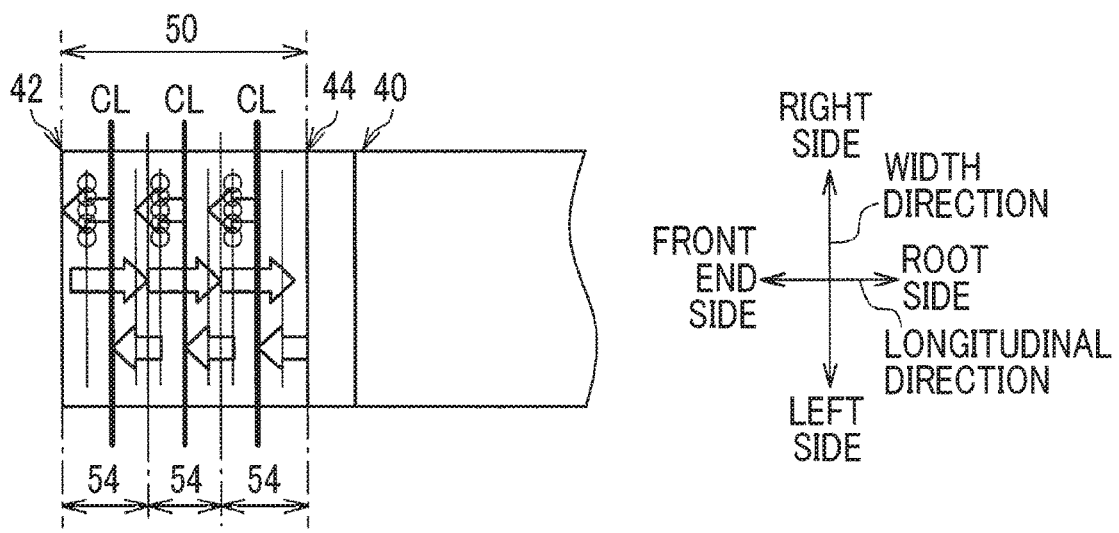
FIG. 10B is a diagram showing a case where the first region is divided into three sub regions and intermediate positions are respectively provided in the sub regions, as a second other example of the radiation start position of the rectilinear scan, in the insulation film peeling method according to the embodiment.
Figure 10C:
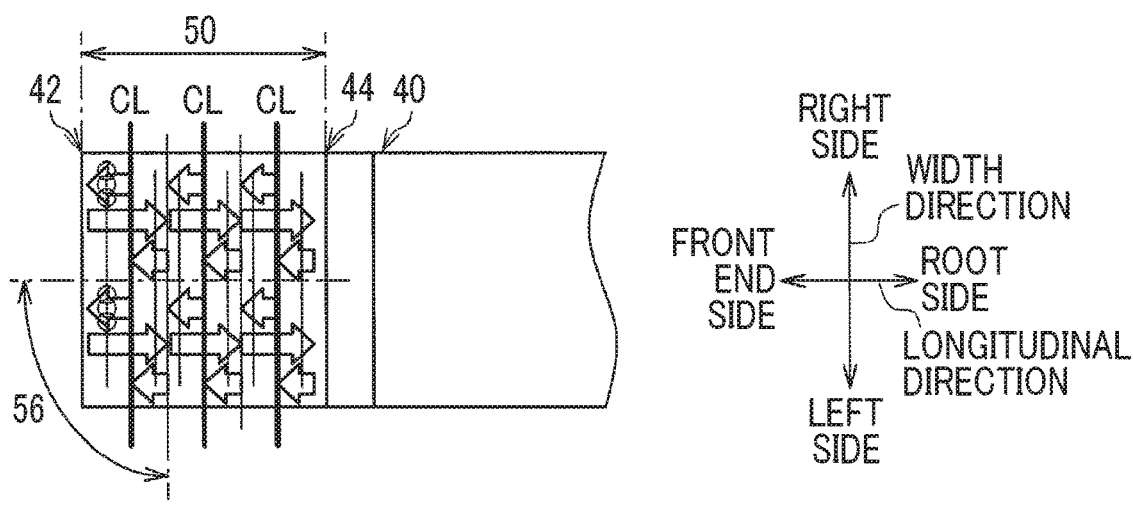
FIG. 10C is a diagram showing a case where the first region is divided into six sub regions and the intermediate positions are respectively provided in the sub regions, as a third other example of the radiation start position of the rectilinear scan, in the insulation film peeling method according to the embodiment.

FIGS. 10A, 10B, and 10C are diagrams showing other examples of the rectilinear scan. In FIG. 9A, while the rectilinear scan in the width direction as the scan direction of the spot 22 is repeated, the scan in the longitudinal direction is performed, and thus the rectilinear scan in the longitudinal direction is performed; order, however, may be reversed. FIG. 10A shows a case where, while the rectilinear scan in the longitudinal direction as the scan direction of the spot 22 is repeated, the scan in the width direction is performed, and thus the rectilinear scan in the width direction is performed. In this case, the intermediate position CL is an intermediate position in the width direction of the first region 50. FIG. 10B shows an example in which the first region 50 is divided into three sub regions 54, and the three sub regions 54 are respectively provided with the intermediate positions CL. In this case, it is possible to increase the number of the turning positions having high temperature T2 to a total of six. FIG. 10C shows an example in which the first region 50 is divided into six sub regions 56, and the six sub regions 56 are respectively provided with the intermediate positions CL. In this case, it is possible to increase the number of the turning positions having high temperature T2 to a total of 12. In this way, the first region 50 is divided into a plurality of sub regions 54, 56, the rectilinear scan is performed respectively on the sub regions 54, 56 with the intermediate positions CL as the radiation start positions, and thus it is possible to increase the number of turning positions having high temperature T2.

Figure 11A:
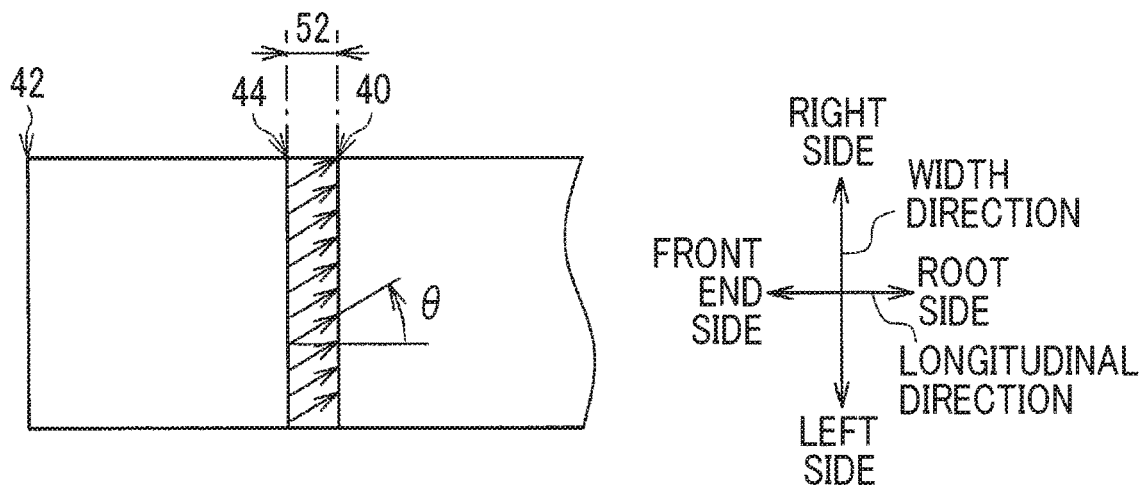
FIG. 11A is a diagram showing a case where the scan direction of a spot inclines at a predetermined angle with respect to the longitudinal direction, as a first other example of the scan direction in the unidirectional scan, in the insulation film peeling method according to the embodiment.
Figure 11B:
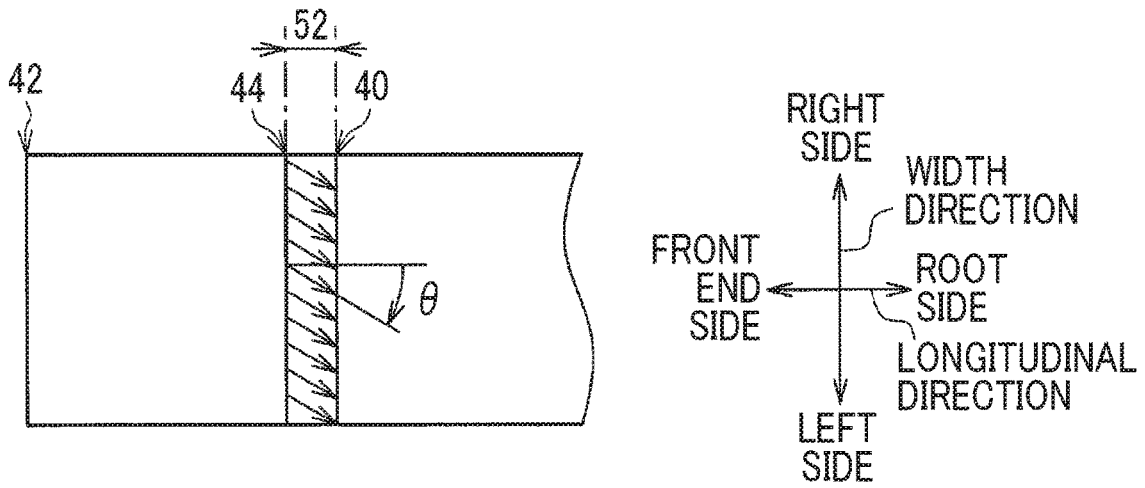
FIG. 11B is a diagram showing a case where an inclination is made at the predetermined angle in a direction opposite to that in the FIG. 11A, as a second other example of the scan direction in the unidirectional scan, in the insulation film peeling method according to the embodiment.
Figure 11C:
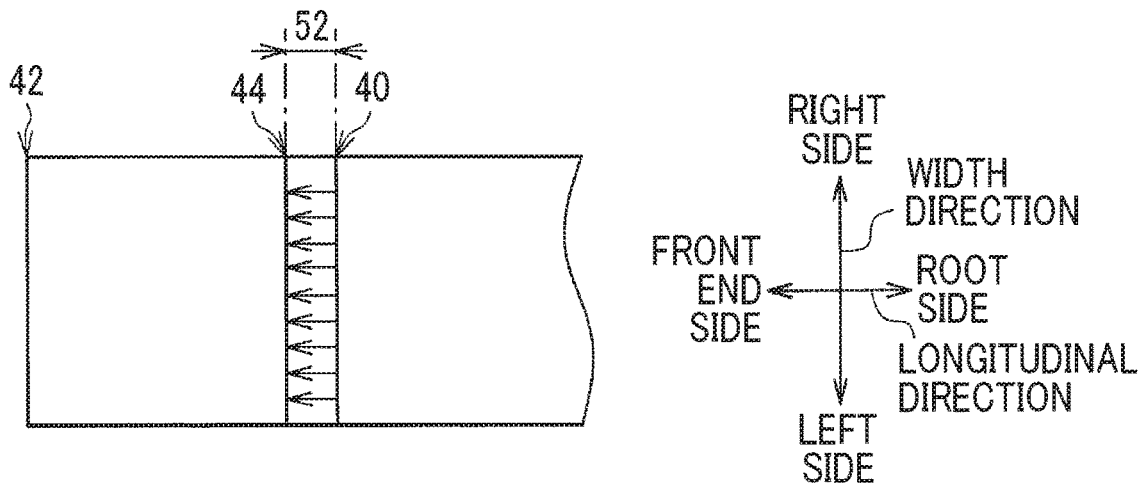
FIG. 11C is a diagram showing a case where the unidirectional scan is repeated from a peeling boundary toward a regional boundary in the longitudinal direction for the scan direction of the spot, without an inclination angle, as a third other example of the scan direction in the unidirectional scan, in the insulation film peeling method according to the embodiment.

In the above description, the unidirectional scan from the regional boundary 44 toward the peeling boundary 40 is repeated in the longitudinal direction as the scan direction of the spot 22 of the unidirectional scan in the second region 52. FIGS. 11A, 11B, and 11C are diagrams showing examples of the scan directions of the unidirectional scan. In FIG. 11A, the scan direction of the spot 22 is inclined at a predetermined angle θ with respect to the longitudinal direction. FIG. 11B is an example in which an inclination is made at a predetermined angle θ in a direction opposite to that in FIG. 11A. Since the scan direction of the spot 22 is inclined in the longitudinal direction, the scan time becomes longer in comparison with the case of not being inclined, and thus the insulation film 34 can be slowly peeled to easily secure the insulation performance on the root side further than the peeling boundary 40. FIG. 11C is a diagram showing an example of repeating the unidirectional scan from the peeling boundary 40 toward the regional boundary 44 in the longitudinal direction as the scan direction of the spot 22 without an inclination angle θ. In the unidirectional scan, the temperature of any position is the same temperature T1, and thus in the case of FIG. 11C as well, the peeling boundary 40 has temperature T1, and the insulation performance of the insulation film 34 on the root side further than the peeling boundary 40 can be secured.

Figure 12:
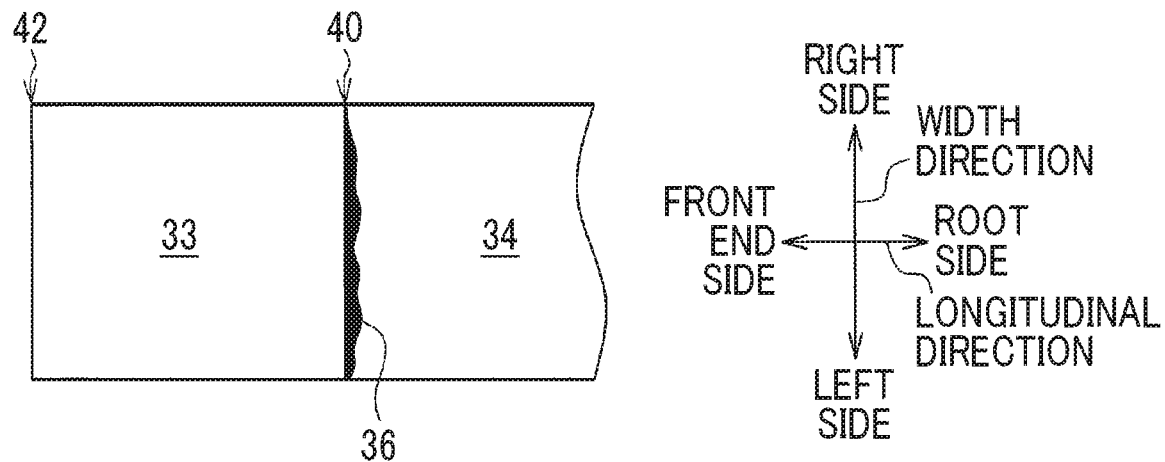
FIG. 12 is a diagram showing a state of the peeling boundary in a case where the second region is not provided, as a comparative example.

The operation effect of the above configuration will be further described using a comparative example. FIG. 12 is a diagram showing a state of the insulation film 34 near the peeling boundary 40 in a case where the second region 52 is not provided, as the comparative example. In this case, the laser light 20 is not radiated onto the root side further than the peeling boundary 40; on the front end side further than the peeling boundary 40, however, the rectilinear scan is performed to shorten the operation time to peel the insulation film. Therefore, the carbonized layer 36 may occur as shown in FIG. 12 by the temperature of the peeling boundary 40 becoming high temperature T2 and a part of the insulation film 34 which is desired to remain for an insulation function being excessively heated as well. When the carbonized layer 36 occurs in the part of the insulation film 34 on the root side further than the peeling boundary 40, the peeling length L0 may fluctuate and the insulation performance may decrease. In contrast, in the insulation film peeling method of FIG. 4, the second region 52 in which the unidirectional scan is performed is provided, and thus the temperature of the peeling boundary 40 is temperature T1 lower than T2, the occurrence of the carbonized layer 36 near the peeling boundary 40 is suppressed, and the peeling length L0 does not fluctuate.

Figure 13A:
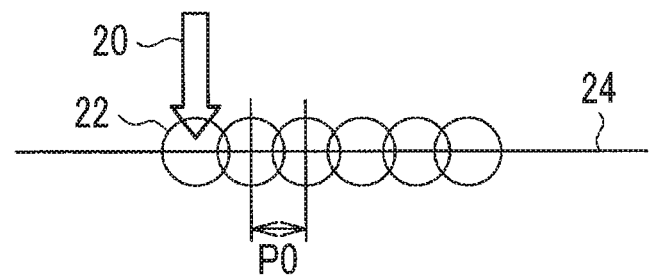
FIG. 13A is a diagram showing a case of a radiation pitch P0 which is a reference in a case of changing a spot radiation pitch of the laser light, as the comparative example of shortening an operation time to peel the insulation film.
Figure 13B:
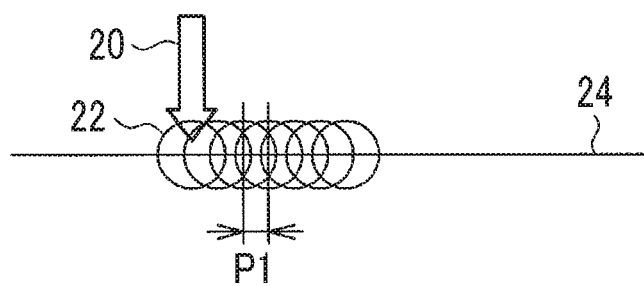
FIG. 13B is a diagram showing a case of a radiation pitch P1 which is narrower than that of FIG. 13A, as the comparative example of shortening the operation time to peel the insulation film.

Next, a comparison is made with a method in the related art used for shortening the operation time to peel the insulation film. In order to peel the insulation film 34 using the laser light 20, it is needed to apply thermal energy of a certain value or more per unit time and per unit area. For the purpose, in a case where the pulse frequency is constant, the scan speed is caused to be slow and the radiation pitch is caused to be narrowed. FIG. 13A shows an example of the radiation pitch P0, and FIG. 13B shows an example of the radiation pitch P1 narrower than that of FIG. 13A. As can be understood by a comparison of FIG. 13A to 13B, when the radiation pitch is narrowed, the scan speed which is a length of the scan of the scan path 24 per unit time becomes slow. Therefore, the operation time to peel the insulation film becomes long. In contrast, in the insulation film peeling method of FIG. 4, although the operation time to peel the insulation film in the first region 50 can be short, the radiation pitch normally has the constant value of P0, and it is not needed to particularly narrow the radiation pitch.

In the related art, in order to shorten the operation time to peel the insulation film when the radiation pitch is constant, either a laser power is caused to be high, or the pulse frequency is caused to be high. In order to increase the laser power, it is needed for the laser light source portion 14 to be high powered, and thus a device cost increases. In contrast, in the insulation film peeling method of FIG. 4, although the operation time to peel the insulation film in the first region 50 can be short, the laser power of the laser light source portion 14 normally has the constant value of W0, and it is not needed for the laser light source portion 14 to be particularly high powered.

Figure 14A:
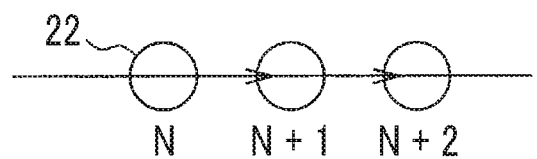
FIG. 14A is a diagram showing a case of a pulse frequency f0 of the laser light set such that positional precisions of the spots do not fluctuate outside a predetermined range, as the comparative example of shortening the operation time to peel the insulation film.
Figure 14B:
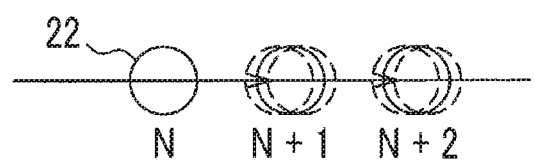
FIG. 14B is a diagram showing the positional precisions of the spots with respect to a pulse frequency f1 which is higher than f0, as the comparative example of shortening the operation time to peel the insulation film.

In the related art, in order to shorten the operation time to peel the insulation film when the radiation pitch is constant and the laser power is constant, the pulse frequency is caused to be high. FIGS. 14A and 14B are diagrams showing a case where the pulse frequency of the laser light 20 is caused to be high. FIG. 14A is a diagram in which the three consecutive radiation spots 22 are arranged and which shows positional precisions in a case of the pulse frequency f0. f0 is set for the positional precision of each spot 22 not to fluctuate outside a predetermined range. FIG. 14B is a diagram in which the three consecutive radiation spots 22 are arranged and which shows the positional precisions with respect to the pulse frequency f1 higher than f0. When the pulse frequency is increased from f0 to f1, time it takes for the radiation of the spot 22 to move from the Nth to the next (N+1)th becomes short, and thus the positional precision of the spot 22 on the scan path 24 is reduced. In FIG. 14B, the fluctuation of the positional precision of the spot 22 is indicated by a broken line. In contrast, in the insulation film peeling method of FIG. 4, although the operation time to peel the insulation film in the first region 50 can be short, the pulse frequency normally has the constant value of f0, and it is not needed to particularly increase the pulse frequency.

As described above, in the insulation film peeling method of FIG. 4, without changing the laser power, the radiation pitch, and the pulse frequency in relation to the laser light 20, by providing the first region 50 where the rectilinear scan is performed on the front end side of the insulation film-coated conducting wire 30, it is possible to shorten the operation time to peel the insulation film. Further, by providing the second region 52 where the unidirectional scan is performed between the first region 50 and the peeling boundary 40, it is possible to secure the insulation performance of the insulation film-coated conducting wire 30.

What is claimed is:

1. An insulation film peeling method which radiates laser light onto a front end portion of an insulation film-coated conducting wire including a conducting wire and an insulation film that coats the conducting wire in a longitudinal direction, and which peels a part of the insulation film up to a peeling boundary of a predetermined regulated peeling length as measured from the front end portion, the insulation film peeling method comprising:

performing a rectilinear scan of a first region up to a regional boundary regulated in advance in front of the peeling boundary as measured from the front end portion, in which a radiation position of the laser light moves from a first side toward a second side and then moves from the second side toward the first side upon reaching the second side; and performing a unidirectional scan of a second region from the regional boundary to the peeling boundary, in which the radiation of the laser light is performed from a third side toward a fourth side and then the radiation position returns to the third side in a state in which the radiation of the laser light stops upon reaching the fourth side.

2. The insulation film peeling method according to claim 1, wherein:

in the scan of the first region, the first side is the front end portion and the second side is the regional boundary; and in the scan of the second region, the third side is the regional boundary and the fourth side is the peeling boundary.

3. The insulation film peeling method according to claim 1, wherein a movement of the laser light is a micro movement for each radiation pitch.

4. The insulation film peeling method according to claim 1, wherein:

a direction in which the insulation film-coated conducting wire extends is set as the longitudinal direction, along a width of the insulation film-coated conducting wire, a right side is set as a right side in a width direction and a left side is set as a left side in the width direction, in the scan of the first region, the first side in the longitudinal direction is set as the front end portion, and the second side in the longitudinal direction is set as the regional boundary, in a movement of the laser light, the rectilinear scan in the width direction is performed by a micro scan by a micro movement for each radiation pitch between the right side and the left side, and a forward scan in the longitudinal direction is performed from the front end portion toward the regional boundary by repeating the rectilinear scan in the width direction from the front end portion toward the regional boundary, after the forward scan, a backward scan in the longitudinal direction is performed from the regional boundary toward the front end portion by repeating the rectilinear scan in the width direction from the regional boundary toward the front end portion, and the scan is repeated a predetermined number of times to be set as the rectilinear scan in the scan of the first region; and in the scan of the second region, the third side in the longitudinal direction is set as the regional boundary, the fourth side in the longitudinal direction is set as the peeling boundary, in the movement of the laser light, a rectilinear unidirectional scan in the longitudinal direction is performed from the regional boundary toward the peeling boundary by the micro scan by the micro movement for each radiation pitch, the rectilinear unidirectional scan in the longitudinal direction is performed from the right side in the width direction toward the left side in the width direction, and the scan is repeated a predetermined number of times to be set as the unidirectional scan in the scan of the second region.

5. The insulation film peeling method according to claim 1, wherein, in the scan of the second region, a movement of the laser light is a micro movement for each radiation pitch along a scan direction which inclines at a predetermined angle with respect to the longitudinal direction of the insulation film-coated conducting wire.

6. An insulation film peeling method which radiates laser light onto a front end portion of an insulation film-coated conducting wire including a conducting wire and an insulation film that coats the conducting wire in a longitudinal direction, and which peels a part of the insulation film up to a peeling boundary of a predetermined regulated peeling length as measured from the front end portion, the insulation film peeling method comprising:

performing a rectilinear scan of a first region up to a regional boundary regulated in advance in front of the peeling boundary as measured from the front end portion, in which a radiation position of the laser light moves from an intermediate position toward a second side, moves toward a first side from the second side upon reaching the second side to turn back, and the radiation position of the laser light moves from the first side toward the intermediate position upon reaching the first side to turn back and then returns to the intermediate position; and performing a unidirectional scan of a second region from the regional boundary to the peeling boundary, in which the radiation of the laser light is performed from a third side toward a fourth side and then the radiation position returns to the third side in a state in which the radiation of the laser light stops upon reaching the fourth side.

7. The insulation film peeling method according to claim 6, wherein:

in the scan of the first region, the first side is the front end portion and the second side is the regional boundary; and in the scan of the second region, the third side is the regional boundary and the fourth side is the peeling boundary.

8. The insulation film peeling method according to claim 6, wherein a movement of the laser light is a micro movement for each radiation pitch.

9. The insulation film peeling method according to claim 6, wherein:

a direction in which the insulation film-coated conducting wire extends is set as the longitudinal direction, along a width of the insulation film-coated conducting wire, a right side is set as a right side in a width direction and a left side is set as a left side in the width direction, in the scan of the first region, the first side in the longitudinal direction is set as the front end portion, and the second side in the longitudinal direction is set as the regional boundary, in a movement of the laser light, the rectilinear scan in the width direction is performed by a micro scan by a micro movement for each radiation pitch between the right side and the left side, and a forward scan in the longitudinal direction is performed from the front end portion toward the regional boundary by repeating the rectilinear scan in the width direction from the front end portion toward the regional boundary, after the forward scan, a backward scan in the longitudinal direction is performed from the regional boundary toward the front end portion by repeating the rectilinear scan in the width direction from the regional boundary toward the front end portion, and the scan is repeated a predetermined number of times to be set as the rectilinear scan in the scan of the first region; and in the scan of the second region, the third side in the longitudinal direction is set as the regional boundary, the fourth side in the longitudinal direction is set as the peeling boundary, in the movement of the laser light, a rectilinear unidirectional scan in the longitudinal direction is performed from the regional boundary toward the peeling boundary by the micro scan by the micro movement for each radiation pitch, the rectilinear unidirectional scan in the longitudinal direction is performed from the right side in the width direction toward the left side in the width direction, and the scan is repeated a predetermined number of times to be set as the unidirectional scan in the scan of the second region.

10. The insulation film peeling method according to claim 6, wherein, in the scan of the first region, the first region is divided into a plurality of sub regions, and intermediate positions of the sub regions are set as radiation start positions for the respective sub regions.

11. The insulation film peeling method according to claim 6, wherein, in the scan of the second region, a movement of the laser light is a micro movement for each radiation pitch along a scan direction which inclines at a predetermined angle with respect to the longitudinal direction of the insulation film-coated conducting wire.

* * * * *